No. 771,527.

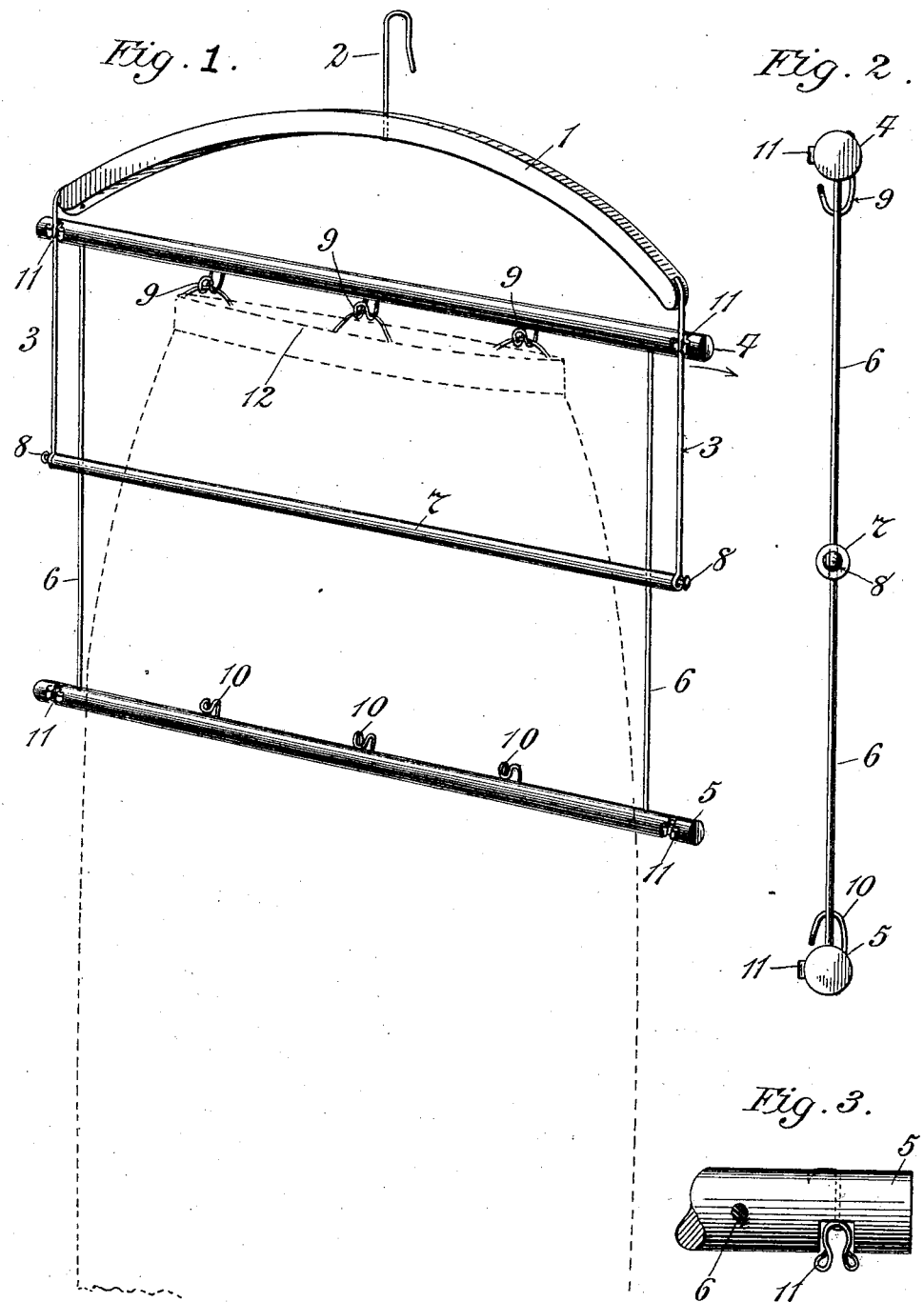

Patented October 4, 1904.

UNITED STATES PATENT OFFICE.

SEYMOUR W. BONSALL, OF NEW YORK, N. Y.

COMBINATION-HANGER FOR GARMENTS.

SPECIFICATION forming part of Letters Patent No. 771,527, dated October 4, 1904.

Application filed April 25, 1904. Serial No. 204,674. (No model.)

*To all whom it may concern:*

Be it known that I, SEYMOUR W. BONSALL, a citizen of the United States, residing in the city, county, and State of New York, have invented a certain new and useful Improvement in Combination-Hangers for Garments, of which the following is a specification.

This invention has relation to an improved combination-hanger for garments; and the principal object of the invention is to provide an inexpensive device capable of use in suspending an entire suit of apparel, whether for men or women, and so simple in operation as to leave no room for mistakes in its actual use.

The improved hanger in question is particularly useful in properly disposing ladies' dresses with extra long skirts or trains and makes it possible to hang dresses of this kind in wardrobes or closets otherwise too short for their accommodation.

The invention is illustrated in a preferred form in the accompanying drawings, wherein Figure 1 is a perspective view of my combined hanger. Fig. 2 is a side view of the revolving or swinging portion of the same; and Fig. 3 is a top view, on a larger scale, of one form of securing means adapted to use in connection therewith.

The combination-hanger comprises a fixed and a revolving portion, the former of which is adapted to be suspended in any desired manner on hooks or other supports in a wardrobe or trunk. This fixed portion of the device can take various forms, according to any special application desired, and I am not to be limited to the form herein shown and described.

In the specific embodiment of the invention which is shown in the drawings the fixed frame comprises a curved hanger-bar 1, provided with a suspending device, such as the hook 2, to which is attached side bars or wires 3. The curved bar 1 is preferably adapted to serve as an ordinary waist or coat hanger to be used with a ladies' waist or a man's coat and vest in a well-known manner.

The revolving portion of the combination-hanger is shown in Fig. 2 and comprises two end bars 4 and 5, which may be of wood, connected by side bars or wires 6, the whole provided with means for pivoting the same between the side bars or wires 3 of the stationary portion of the device. In the specific form shown the pivoting means comprise a central bar 7, which may be of wood, through which the wires 6 pass, said central bar being provided with end pins or pivots 8, which are embraced by appropriate loops or equivalent devices at the ends of the side wires 3.

Each of the end bars 4 and 5 is provided with attaching-hooks 9 and 10, which are preferably formed of bent wire, as shown in the drawings. The hooks on the bar 4 open in the same direction as the hooks on the bar 5, and in each instance the hooks project from the end bars toward the center bar and toward each other. I prefer to place these hooks, as shown, in such a position and to so proportion them that they are shielded from contact from garments folded over the bars carrying said hooks by the overhang or lateral bulge of said bars themselves. This is of importance in preventing undue wear and tear of garments, especially where trimming or lace is used which might catch on a hook and become torn.

The revolving portion or frame is preferably provided with means whereby it may be given a temporary attachment to the stationary portion of the device, and I prefer to provide means for such attachment in either of the two operative positions of the revolving frame.

In the form shown the spring-clips 11 (clearly shown in Fig. 3) are employed, and these are preferably set into recesses in the end bars in the manner shown. They are preferably securely fastened in place by means of clenched nails, as shown in dotted lines in Fig. 3. These clips are adapted to embrace the side wires on the stationary portion of the device, as indicated in Fig. 1, whereby the two parts are attached one to the other, while permitting them to be detached at any time by exerting a sufficient amount of pressure to open the clips.

This combination device when in the position shown in Fig. 1, with the two parts held together by the clips on either of the end bars, can be employed for suspending an entire dress or an entire suit of men's clothing. For the former purpose the ladies' skirt is suspended by tapes to the upper row of hooks 9 and will then assume the position indicated in dotted lines in Fig. 1 at 12. The waist would be hung over the bar 1 in the usual manner. The whole dress can then be hung up by the hook 2 or equivalent devices on any appropriate support. In suspending a man's suit the coat and vest would be slipped over the upper bar 1 in the usual manner, and two or more pairs of trousers, being properly folded, could be hung over the rigid bars 4 and 7.

If the skirt of the dress is too long for the height of the wardrobe in which it is to be hung, as would ordinarily be the case with a train-dress, the tapes are first adjusted on the hooks 9, as shown in Fig. 1, the dress being placed in front of the entire hanging device, as shown in Fig. 1. The clips are then pushed out of engagement with the side wires 3, and the revolving frame is revolved or turned about the pivots 8 through one hundred and eighty degrees in the direction indicated by the arrow in Fig. 1.

The revolution of the movable frame around its pivots causes the lower bar 5 to form a fold in the skirt and to bring the skirt continually higher until the clips 11 in the lower bar 5 are brought into engagement with the side wires 3. The arrangement of the hooks 9 is such that in proportion as the revolving frame is turned on its pivots the tapes on the skirt slip back toward the base of the hook and are thus absolutely secured without danger of coming off of the hook during operation of the device. The hooks 10 are so placed, as heretofore mentioned, that they never come in contact with the skirt, which is held away from them by the shielding effect of the large bar 5. After completion of the semirevolution of the revolving frame, as above described, the train-dress will be ready for suspension, having been virtually shortened by an amount equal to the distance between the two end bars 4 and 5.

It is obvious that a hanger could be made on the principle involved in my broad invention wherein only one pair of clips was used and only one rows of hooks; but the use of clips and attachment-hooks is a valuable element of my more specific invention. This is because the fuller equipment, substantially as herein illustrated, prevents all mistakes in operation, since the device is always ready for use in whichever of its two positions the revolving frame may be found.

It will be seen from the drawings that the openings of the supporting-hooks and of the securing-clips are turned in the same direction, which relative position is preferred in order that the tapes may not tend to slip off of the hooks during operation of the device.

This device may be employed in various ways without departing from the scope of my invention, and I am not to be limited to the details herein shown and described.

What I claim is—

1. In a device of the class described, a stationary portion and a revolving portion pivoted thereon, said revolving portion comprising two end folding bars and securing means on both of said bars for establishing temporary connection between the stationary and revolving bars, substantially as described.

2. In a device of the class described, a stationary portion, and a revolving portion, said revolving portion comprising two folding bars, each having a recess near each end and spring-clips in said recesses for securing said revolving portion to said stationary portion, substantially as described.

3. In a device of the class described, a stationary portion and a revolving portion, said revolving portion comprising two folding bars, each provided with a row of attachment-hooks, the hooks in each row projecting toward the other, substantially as described.

4. In a device of the class described, a stationary portion comprising a curved hanger-bar and two side wires attached thereto; in combination with a revolving portion comprising two end bars and a central bar said central bar being pivoted at its ends between the side wires of the stationary portion, substantially as described.

5. In a device of the class described, a stationary portion, a revolving frame comprising two end bars, a middle bar, side wires attached to said end bars and passing through said middle bar and means whereby the ends of said middle bar are pivotally attached to said stationary portion of the device, substantially as described.

6. In a device of the class described, a stationary portion and a revolving portion pivoted thereto comprising two end bars, a row of hooks in each of said bars all of said hooks projecting inwardly from said bars and all opening in the same direction and securing-clips on both of said end bars, substantially as described.

7. In a device of the class described, a stationary portion comprising a curved hanger-bar and side wires, in combination with a revolving portion pivoted to said side wires comprising two end bars each provided with securing-clips and each provided with attaching-hooks, substantially as described.

8. In a device of the class described, a stationary portion, a revolving portion pivoted thereon and comprising two folding bars, and means adapted to secure the two portions temporarily in whichever extreme position the revolving portion occupies with relation to the stationary portion, substantially as described.

SEYMOUR W. BONSALL.

Witnesses:
H. S. MACKAYE,
FLORENCE PICK.